COUPLED FILM MAGNETIC MEMORY
Filed May 5, 1964 2 Sheets-Sheet 1
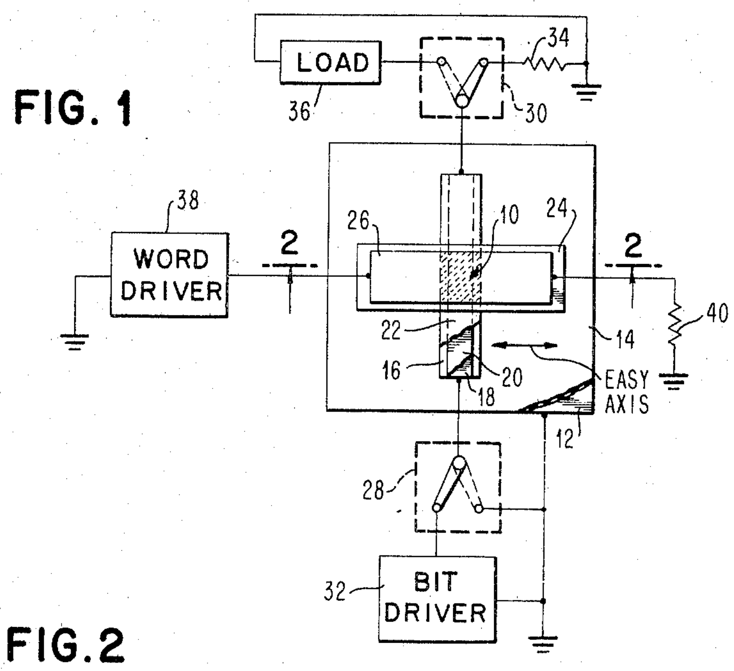
FIG. 1, FIG. 2
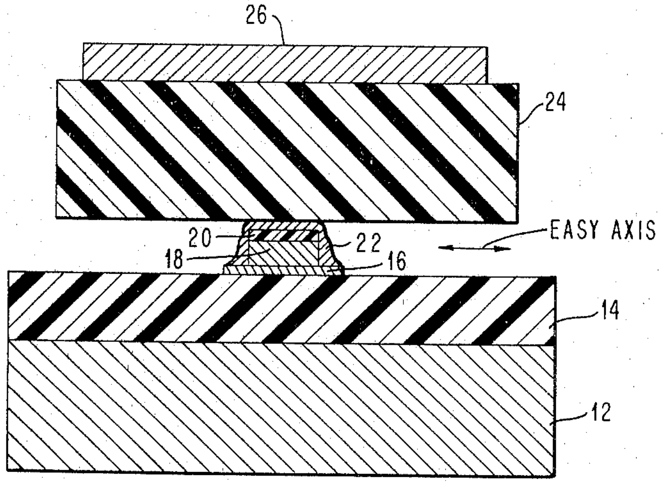
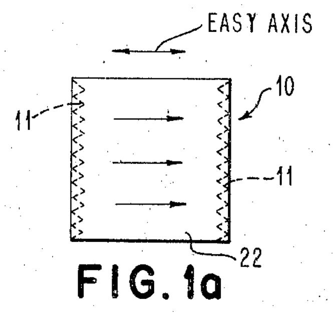
FIG. 1a
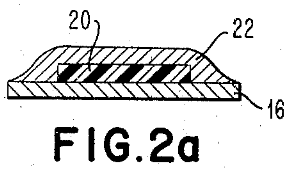
FIG. 2a
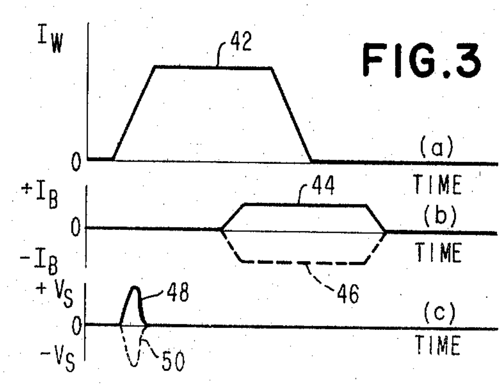
FIG. 3
INVENTOR
OTTO VOEGELI
BY Stephen J. Limanek
ATTORNEY Dec. 16, 1969 O. VOEGELI 3,484,756

COUPLED FILM MAGNETIC MEMORY

Filed May 5, 1964 2 Sheets-Sheet 2

United States Patent Office 3,484,756

Patented Dec. 16, 1969

3,484,756

COUPLED FILM MAGNETIC MEMORY

Otto Voegeli, West Lafayette, Ind., assignor to International Business Machines Corporation, New York, N.Y., a corporation of New York Filed May 5, 1964, Ser. No. 364,982
Int. Cl. G11b *5/00*
U.S. Cl. 340—174 2 Claims

ABSTRACT OF THE DISCLOSURE

A magnetic memory coupled film storage element and array which consists, in the first instance, of a pair of low resistivity magnetic layers, an alloy of iron and aluminum, for example, which are in contacting relationship at their edges and have a common easy axis. A layer of non-magnetic material, a conductor or a dielectric, for example, is interposed between the magnetic layers and a circuit for passing current substantially only through said magnetic layer is connected to said magnetic layers. The magnetic layers are spaced apart a distance less than one-twentieth the width of the layer at points other than the contacting edges to eliminate the demagnetizing fields in the magnetic layers. A conductor orthogonally disposed to said magnetic layers is used as a word line which in conjunction with the magnetic layers or a conductor disposed between the layers writes information into a discrete portion of the magnetic layers when both are energized from a source of energy. The word line when energized alone, reads out information which has been stored in a discrete portion of the magnetic layers. An array is made up of a plurality of these elements and consists of a plurality of parallel magnetic strips contacting at their edges with a non-magnetic material disposed therebetween. Orthogonally disposed conductive elements form word lines which when energized in conjunction with an energization of the non-magnetic material or the magnetic layers, selectively stores information in a memory element as described above.

In the arrangements described, the magnetic layers serve as storage elements, bit drive lines and sense lines.

In a copending U.S. patent application having Ser. No. 357,417 filed on Apr. 6, 1964, by H. Change et al., there is described a storage system utilizing coupled films formed by first and second sets of parallel magnetic strips orthogonally disposed with respect to each other and means for orienting the magnetization in the coupled films which includes a set of parallel electrically conductive strips interposed between the first and second sets of magnetic strips. The magnetic strips have an easy axis in a common direction and completely surround each of the conductive strips at each intersection of two magnetic strips. The coupled films described hereinabove are very insensitive to stray or disturb magnetic fields and are virtually creep free.

It is an object of this invention to provide a creep free coupled magnetic film system which is easier to fabricate.

Another object of this invention is to provide a creep free coupled magnetic film system which has a simpler structure.

Yet another object of this invention is to provide a storage system utilizing coupled films with a higher packing density.

In accordance with the present invention a storage system is provided which utilizes coupled films formed by first and second sets of parallel magnetic strips and a set of non-magnetic strips arranged so that each of the non-magnetic strips is completely surrounded by a pair of the magnetic strips and a set of electrically conductive strips superimposed over the magnetic and non-magnetic strips in an orthogonal arrangement.

An important advantage of this invention is that a bit line concentrates the bit field so as to reduce inductive coupling between bit lines.

An important feature of this invention is that the magnetic strips serve as storage elements, bit drive lines and sense lines.

The foregoing and other objects, features and advantages of the invention will be apparent from the following more particular description of preferred embodiments of the invention, as illustrated in the accompanying drawings.

In the drawings:

FIG. 1 illustrates an embodiment of the magnetic film storage system of the present invention showing only one storage element.

FIG. *1a* illustrates an enlarged view of the top surface of the storage element of the system shown in FIG. 1.

FIG. 2 is a cross-sectional view of the storage element of the system illustrated in FIG. 1 taken through line 2—2.

FIG. *2a* is a cross-sectional view of a modification of the storage element illustrated in FIGS. 1, *1a* and 2.

FIG. 3 illustrates a pulse program for the system shown in FIG. 1.

Figure 4:
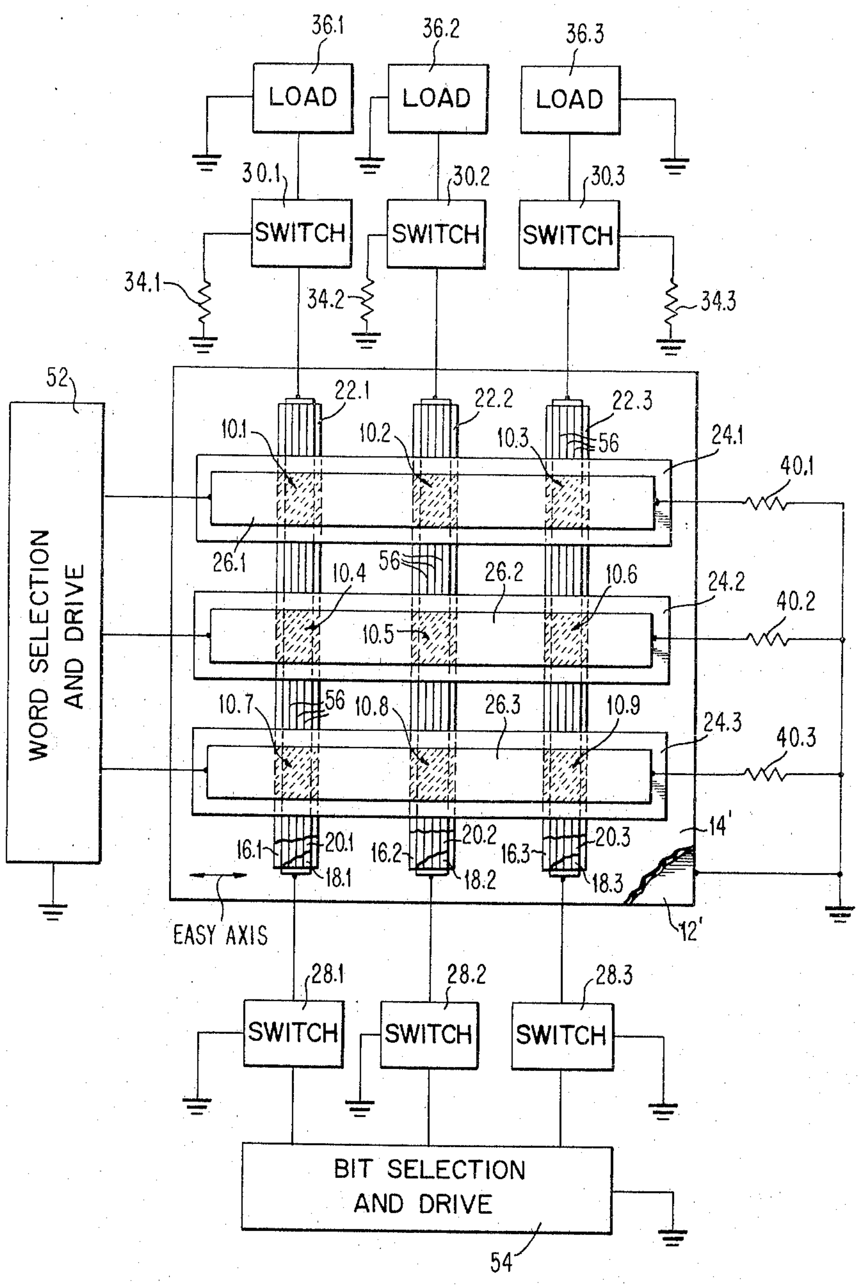
FIG. 4 shows a magnetic film storage system of the present invention which includes a planar array having a plurality of storage elements.

Referring to the drawings in more detail, there is shown in FIGS. 1, *1a* and 2 an embodiment of the magnetic film storage system of the present invention which for purposes of illustration only is limited to a single magnetic coupled film 10. The coupled film 10 is formed on a substrate 12 which is preferably an electrically conductive ground plane on which is deposited a first layer of insulating material 14, for example, silicon monoxide. Deposited on the insulating layer 14 through a suitable given mask (not shown) in the presence of a given magnetic field is a first strip of magnetic material 16, for example, of permalloy about 2,000 angstroms thick, forming the bottom layer of the coupled film 10. The given magnetic field is directed substantially transversely of the magnetic strip 16 to establish an easy axis in the strip 16 in the direction of the magnetic field, as indicated in FIGS. 1, *1a* and 2. A flat strip of electrically conductive material 18 having a width slightly less than that of the magnetic layer 16 is disposed on the magnetic strip 16. A second layer of insulation 20 is deposited on the conductive strip 18. A second strip of magnetic material 22, for example, of parmalloy about 2,000 angstroms thick, deposited on the second insulating layer 20 and on the edges of the first magnetic strip 16 through the given mask in the presence of the given magnetic field forms the upper layer of the coupled film 10. Disposed over the second strip of magnetic material 22 in a direction orthogonal to that of the first and second magnetic strips 16 and 22 is a third layer of insulating material 24 which may be made of, for example, Mylar. A second electrically conductive strip 26 is disposed on the third layer of insulation 24 also orthogonally arranged with respect to the first and second magnetic strips 16 and 22. The second conductive strip 26 may be used as a word line for the storage or memory system.

The first conductive strip 18 is connected at one end to a first switching means 28 and at the other end to a second switching means 30. The first switching means 28 is operative to connect one end of the first conductive strip 18 either to a bit line driver or generator 32 or to ground or the conductive substrate 12, while the second switching means 30 is operative to connect the other end of the first conductive strip 18 either to ground through a line terminating impedance 34 or to a load 36, which may be a conventional sense amplifier. One end of the second conductive strip or word line 26 is connected to a word line driver 38 and the other end of the word line 26 is connected through a word line terminating impedance 40, which is preferably the characteristic impedance of the word line 26, to ground. The first and second switching means 28 and 30 are preferably ganged so that when the one end of the first conductive strip 18 is connected to the bit line driver 32 by the first switching means 28, the other end of the first conductive strip 18 is connected to ground through the impedance 34 by the second switching means 30, and when the other end of the first conductive strip 18 is connected by the second switching means 30 to the load 36, the one end of the first conductive strip 18 is connected by the first switching means 28 to ground. By providing the first and second switching means 28 and 30 in the system of the present invention, the first conductive strip 18 may be used as a common bit and sense line. If the switching means 28 and 30 are not used, an additional line similar to the first conductive line 18 may be provided as a sense line. When the substrate 12 is a ground plane, as illustrated in FIG. 1, it is used as the return path for the bit and word lines.

In FIG. 2*a* there is illustrated in cross-sectional view a modification of the coupled film illustrated in the system of FIGS. 1, 1*a* and 2. The modified coupled film of FIG. 2*a* is similar to that of coupled film 10 but differs therefrom in that it does not include the first conductive strip 18. The modified coupled film of FIG. 2*a* may be used when the resistivity of the magnetic material of the strips is low. A suitable low resistivity material for this film is an alloy of iron and aluminum or $Fe_3Al$. When the modified coupled film of FIG. 2*a* is used in the system of the invention, the first and second switching means 28 and 30 are connected directly to the ends of the magnetic strips 16 and 22.

FIG. 3 of the drawing shows a pulse program which may be used in connection with the operation of the system shown in FIGS. 1, 1*a* and 2 of the drawing or the system when employing the modified coupled film of FIG. 2*a*.

In the operation of the embodiment illustrated in FIGS. 1, 1*a* and 2 of the drawing, to store information in the magnetic coupled film 10, a positive pulse of current 42 indicated in FIG. 3 at *a* is passed through the word line 26 from the word line driver 38 of FIG. 1 to provide a magnetic field in the coupled film 10 which is perpendicular to the easy axis of the film 10, that is, in the direction of the hard axis of the coupled film 10, and a positive or negative pulse 44 or 46 of current, indicated in FIG. 3 at *b*, is passed through the first conductive strip 18 from the bit line driver 32 to provide a magnetic field in the coupled film 10 along the easy axis thereof. It can be seen that the current pulse 42 in the word line 26 produces a magnetic field in the bottom and top layers 16 and 22, respectively, of the coupled film 10 which orients the magnetization in the coupled film 10 in a direction perpendicular to the easy axis of the film 10, that is, in the hard axis. Accordingly, when only a magnetic field produced by the word current pulse 42 is applied to the coupled film 10, the magnetization of the film 10 is indicative of neither a "0" or a "1" bit of information. However, when current is passed concurrently through the word line 26 and the first conductive strip 18, the magnetization of the coupled film 10 is disposed in a direction located at an angle to the hard direction at one side or the other in each layer 16 and 22 thereof depending upon whether a positive pulse 44 or a negative pulse 46 is passing through the first conductive strip 18. To write a "1" into the coupled film 10, a positive current pulse 42 or $I_w$ from the word line driver 38 is applied to the word line 26 and concurrently therewith the positive current pulse 44 or $+I_b$ from bit line driver 32 is applied to the first conductive strip 18. The positive word current pulse 42 is terminated prior to the termination of the positive bit current pulse 44. When only a field produced by the positive word current pulse 42 is applied to the coupled film 10, the magnetization in both the top and bottom layers 16 and 22, respectively, of the coupled film 10 may be considered to be in an upwardly vertical direction. When a magnetic field is thereafter concurrently produced by the positive bit current pulse 44, the magnetization is rotated in a clockwise direction in the top layer 22 and counterclockwise in the bottom layer 16 of the coupled film 10 toward the horizontal direction, that is, toward the easy axis of the coupled film 10. When the positive word current pulse 42 is terminated, the magnetization in the upper layer 22 is established horizontally to the right, as indicated in FIG. 1*a* of the drawing, and in the bottom layer 16 horizontally to the left, i.e., anti-parallel with respect to the magnetization in the upper layer 22. To store a "0" bit of information in the system illustrated in FIGS. 1, 1*a* and 2 of the drawing, the operation is similar to that described hereinabove in connection with a storage of a "1" bit of information except that a negative bit current pulse 46 or $-I_b$ from bit driver 32 is passed through the first conductive strip 18 to produce a magnetic field in the coupled film 10 which rotates the magnetization in the top layer 22 in a counterclockwise direction while rotating the magnetization of the bottom layer 16 in a clockwise direction toward the easy axis of the coupled film 10. When the coupled film 10 is storing a "0" bit of information, the direction of the magnetization of the top and bottom layers are opposite to that when a "1" bit of information is stored. Reading the information stored in the coupled film 10 is accomplished by connecting the load 36 to the first conductive strip 18 and passing a word current 42 or $I_w$, indicated in FIG. 3 at *a*, through the word line 26. The output pulses indicated in FIG. 3 at *c* are bipolar, a positive voltage 48 or $+V_s$ representing a "1" bit of information and a negative voltage 50 or $-V_s$ representing a "0" bit of information.

By providing a coupled film with top and bottom layers closely spaced, i.e., by only a single conductive drive line and a thin layer of insulation, the magnetostatic coupling substantially eliminates the demagnetizing fields in each of the layers 16 and 22 of the coupled film 10. To achieve this condition the separation between the magnetic layers 16 and 22 should be less than $\frac{1}{20}$ of the width of the coupled film in the direction of its easy axis with the bit length in the hard direction, which is defined by the width of the second conductive strip 26, at least as long as the bit width. Furthermore, by extending the magnetic layers 16 and 22 of the coupled film 10 beyond the first conductive strip 18 at the two opposite sides thereof and joining or contacting one another along the two sides in an overlapping arrangement, substantially demagnetized edges 11, indicated in FIG. 1*a* of the drawing, at the overlapping sections of the coupled film 10 are formed which function as an anchor for the boundary domain walls established in the layers 16 and 22 across the film strip width between the demagnetized edges 11.

The demagnetization or edge effect at the edges of the two layers 16 and 22 of magnetic material at their regions of overlap can be explained in the following manner. Due to strong exchange coupling, at any one point, in the overlap regions 11, the magnetization in the top and bottom layers 16 and 22 of the coupled film 10 are parallel instead of anti-parallel. However, at two adjacent points magnetization may be in opposite directions to produce in the two overlapping edges 11 effectively a demagnetized state. On the other hand, the portions of the top and bottom layers 16 and 22 between the two overlapping edges 11 which are separated by the first conductive strip 18 have anti-parallel magnetizations for the top and bottom magnetic layers and exhibit edge domains of only about $\frac{1}{10}$ the size observed in single films, i.e., about 1 micron in diameter, indicating considerable cancellation of demagnetizing fields through close spacing, for example, less than 2 microns, of the magnetic layers 16 and 22 with the with the anti-parallel magnetizations. It should be noted that this cancellation is produced despite the ineffectiveness of the overlapping edges 11 which have an easy axis corresponding to that of the layers 16 and 22 to provide complete flux closure. The overlapping edges 11 are relatively immune to disturb fields since the bit current tends to move the top and bottom portions of a domain wall in the overlapping edges in opposite directions and, thus, the two opposite forces tend to cancel each other. Besides, the film property especially the coercive field depends on film thickness and on the layer conditions. Higher coercive fields can usually be maintained for the edges. The domain walls in the central portions of the layers 16 and 22 defining an item of information either directly extend into the edges 11 or diffuse into the edges 11 through curling. In either case, the edges 11 serve as anchors for these domain walls and prevent them from moving. In wide magnetic strips this effect is manifested by wall bending or bowing at the edges of the coupled film 10 parallel to the easy axis thereof.

It can be seen that the coupled film 10 is fabricated essentially by merely depositing a first magnetic strip on a substrate, depositing a conductive strip of a width slightly less than that of the first strip onto the first strip, depositing a second magnetic strip over the conducive strip in a direction corresponding to that of the first magnetic and conductive strips and then defining the length of the coupled film 10 by the width of the second conductive strip 26 orthogonally arranged with respect to the magnetic strips. More specifically the effective storage area of the coupled film 10 is defined by the width of both the first and second conductive strips. It should be noted that variation of even a few degrees in the direction of the second conductive strip 26 with respect to the normal of the first conductive strip or the first magnetic strip will not appreciably change the geometry of the coupled film 10. Thus, a high degree of precision in the positioning of the second conductive strip 26 with respect to the first conductive strip 18 in the fabrication of the coupled films of the present invention is not required to provide relatively uniform storage elements in an array. To make two or more strips of different widths, such as, magnetic strip 16 and conductive strip 18, with the use of a single mask in an evaporation system, it is only necessary, for example, to provide different beam angles from the different material sources.

In the system illustrated in FIGS. 1, 1*a* and 2 of the drawing, output voltages in the sense line 18 applied to the load 36 of about 10 millivolts are produced when word currents $I_w$ of 0.5 amperes and bit currents $I_b$ of 0.030 amperes are supplied to the word line 26 and bit line 18, respectively, during the writing operation and when each of the layers 16 and 22 of the coupled film 10 is 0.020 inch x 0.040 inch x 2,000 angstroms having an anisotropy field $H_k$ of about 4 oersteds and a coercive force of about 3 oersteds.

The first conductive strip 18, which is made of material having a resistivity approximately ten times less than that of the magnetic material of the first and second magnetic strips 16 and 22, need not be surrounded completely with insulation material but it has been found preferably to provide an insulation layer 20 between only the first conductive strip 18 and the second magnetic strip 22 to provide a smoother underlayer for the top magnetic layer 22.

A thickness of 2,000 angstroms has been suggested hereinabove for the top and bottom layers 22 and 16, respectively, of the coupled film 10, however, thicknesses between 10,000 and 20,000 angstroms may be used if desired, the thickness being limited only by fabrication and eddy current considerations.

Since magnetic material such as permalloy does not have a very high resistivity, some bit current can pass through the magnetic material of the magnetic strips 16 and 22 as well as through the first conductive strip 18. However, when the resistivity of the magnetic strips 16 and 20 is low, such as when an alloy of iron and aluminum or $Fe_3Al$ is used, the first conductive strip 18 need not be provided. A resulting structure such as that shown in FIG. 2*a* may then be used. The bit current 44 or 46 indicated in FIG. 3 at *b* then passes through only the first and second magnetic strips 16 and 22 to set up magnetic fields in the magnetic strip 16 and 22 which are anti-parallel to store information therein as explained hereinabove in connection with the description of the system of FIGS. 1, 1*a* and 2.

The operation of the system of the present invention when utilizing the modified coupled film illustrated in FIG. 2*a* of the drawing is similar to that described hereinabove in connection with the embodiment illustrated in FIGS. 1, 1*a* and 2. Furthermore, the system utilizing the coupled film of FIG. 2*a* has the obvious additional fabrication advantage of not requiring the first conductive strip 18.

In FIG. 4 of the drawing there is illustrated an embodiment of the present invention which includes a planar array of a plurality of coupled films 10.1 to 10.9. The system is word organized having a plurality of horizontal word lines 26.1, 26.2 and 26.3 and a plurality of vertical bit lines 18.1, 18.2 and 18.3. The bit lines 18.1, 18.2 and 18.3 are interposed between first magnetic film strips 16.1, 16.2 and 16.3 and second magnetic strips 22.1, 22.2 and 22.3, respectively, with first insulation strips 20.1, 20.2 and 20.3 disposed over the bit lines 18.1, 18.2 and 18.3, respectively, and the word lines 26.1, 26.2 and 26.3, disposed over the second insulation strips 24.1, 24.2 and 24.3, are orthogonally arranged with respect to the bit lines 18.1, 18.2 and 18.3, which are all supported on a conductive substrate 12' and an insulation layer 14' in a manner similar to that described hereinabove in connection with the description of the system illustrated in FIGS. 1, 1*a* and 2 to form the coupled films 10.1 to 10.9.

The word lines 26.1, 26.2 and 26.3 are each connected at one end to a word selection and drive means 52 and at the other end to ground through word line terminating impedances 40.1, 40.2 and 40.3, respectively. The word selection and drive means 52 provides address selection of a particular word line 26.1, 26.2 or 26.3 and pulse generation corresponding to the word line driver 38 of the system of FIGS. 1, 1*a* and 2. The bit lines 18.1, 18.2 and 18.3 passing between the top and bottom magnetic layers of aligned coupled films 10.1, 10.4 and 10.7, 10.2, 10.5 and 10.8 and 10.3, 10.6 and 10.9, respectively, are connected to bit selection and drive means 54 through a respective switch 28.1, 28.2 and 28.3 and are further connected at the opposite end to loads 36.1, 36.2 and 36.3 through a respective switch 30.1, 30.2 and 30.3. The means 54 provides the function of bit addressing and pulse generation corresponding to the bit line driver 32 of the system of FIGS. 1, 1*a* and 2, while each switch 28.1, 28.2 and 28.3 corresponds to the switch 28 and each switch 30.1, 30.2 and 30.3 corresponds to the switch 30 of FIG. 1. The domain structure of the first and second magnetic strips 16.1, 16.2, 16.3, 22.1, 22.2 and 22.3 between the coupled films 10.1–10.9 is not determined in the operation of this embodiment of the system of the present invention. Thus, demagnetized conditions between the coupled films 10.1–10.9 without stray field may be obtained by, for example, making cuts or slits 56 in the magnetic strips between the coupled films in a direction parallel to the long edges of the magnetic strips.

In the operation of the system illustrated in FIG. 4 of the drawing "1" and "0" bits of information are to be written into the coupled films of a word line, for example, into films 10.4, 10.5 and 10.6 of the word line 26.2, the word selection and drive means 52 is operated to pass a current corresponding to the current indicated at 42 of FIG. 3 at *a* of the drawing through the word line 26.2 and the bit selection and drive means 54 is operated to pass through the bit lines 18.1, 18.2 and 18.3 current which may be related in time to the current in the word line 26.2 as indicated at 44 and 46 in FIG. 3 of the drawing and having polarities corresponding to the bit or digital information to be stored in the coupled films 10.4, 10.5 and 10.6, in the manner described hereinabove in connection with the writing of "1" and "0" bits of information in the system of FIGS. 1, 1*a* and 2. When information stored in the coupled films 10.4, 10.5 and 10.6 is to be readout, the word selection and drive means 52 is operated to pass a current through the word line 26.2 to orient the magnetization in the coupled films 10.4, 10.5 and 10.6 in the hard direction. When a destructive read operation is desired, a current having a magnitude sufficient to orient the magnetization completely in the hard direction is passed through the word line 26.2. When a non-destructive read operation is desired, a current having a magnitude less than that which would completely magnetize both the top and bottom layers of the coupled films 10.4, 10.5 and 10.6 in the hard direction is passed through the word line 26.2. The output signal indicative of the stored information in the coupled films 10.4, 10.5 and 10.6 of the word line 26.2 are bipolar as stated hereinabove in connection with the description of FIG. 1 and are applied to their respective loads 36.1, 36.2 and 36.3, which may be a conventional sense amplifier, by the proper operation of the switches 28.1, 28.2, 28.3, 30.1, 30.2 and 30.3. Information is written into and read out of the coupled films 10.1, 10.2 and 10.3 and 10.7, 10.8 and 10.9 associated with the word lines 26.1 and 26.3, respectively, in a similar manner as described hereinabove with the handling of information in the word line 26.2 by the proper operation of the word and bit selection and drive means 52 and 54.

It can be seen in FIG. 4 of the drawing that an unselected bit or coupled film is subjected to the full bit field and to a stray field from selected neighboring word lines. Under the influence of such repeated disturb field the reverse edge domains grow and finally eliminate the original stored information in conventional magnetic films. However, by providing a bit line in which the bit field is concentrated in magnetic material, inductive coupling and stray field between bit lines is materially reduced and a small distance between the bit line and ground plate yields low impedance to reduce capacitive cross-talk. Furthermore, due to high magnetostatic coupling and demagnetized edges in the coupled films, a system of very low disturb sensitivity is provided.

It should be understood that the teachings of the present invention are applicable to systems having two or three dimensional magnetic memory arrays and to arrays having conductive or nonconductive substrates and that the invention is not limited to any particular mode of operation, since, for example, storage may be performed by processes other than the rotational processes described hereinabove. It should also be understood that bipolar or unipolar writing processes may be used in the invention. Furthermore, the magnetic material of the coupled films may be made of any desired material although permalloy or an alloy of iron and aluminum are preferred and the material of the conductive strips may be, for example, silver, copper, aluminum or gold.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A storage system comprising:

(a) a coupled film magnetic memory element including a pair of low resistivity magnetic layers each of a given width in contact with each other at opposite edges thereof along the length thereof and a nonmagnetic layer interposed between said pair of magnetic layers, said magnetic layers having a common easy axis perpendicular to the length thereof, (b) means including circuit passing current in the pair of magnetic layers along the length thereof in said coupled film.

2. A storage system as set forth in claim 1 wherein said means for storing information further includes:

(a) an electrically conductive strip disposed perpendicularly to the length of said pair of magnetic layers.

References Cited

UNITED STATES PATENTS

| | | | |
|---|---|---|---|
| 3,192,512 | 6/1965 | Korkowski | 340—174 |
| 3,276,000 | 9/1966 | Davis | 340—174 |
| 3,375,503 | 3/1968 | Bertelsen | 340—174 |

BERNARD KONICK, Primary Examiner

S. B. POKOTILOW, Assistant Examiner